United States Patent [19]

Ducret

[11] Patent Number: 4,977,671
[45] Date of Patent: Dec. 18, 1990

[54] SAW FOR CUTTING LARGE DIAMETER SHIELDED CONDUIT

[76] Inventor: Lucien C. Ducret, 9 Tod's Driftway, Old Greenwich, Conn. 06870

[21] Appl. No.: 262,316

[22] Filed: Oct. 25, 1988

[51] Int. Cl.$^5$ .............................................. B21F 13/00
[52] U.S. Cl. ................................... 30/90.2; 30/91.2; 30/90.3; 30/92.5; 81/9.4
[58] Field of Search ...................... 30/90.2, 90.8, 91.2, 30/92.5, 90.3; 81/9.4, 9.51

[56] References Cited

U.S. PATENT DOCUMENTS

| | | | |
|---|---|---|---|
| 3,535,785 | 10/1970 | Matthews | 30/91.2 |
| 3,796,115 | 3/1974 | Dane | 30/91.2 |
| 3,851,387 | 12/1974 | Ducret . | |
| 4,142,290 | 3/1979 | Ducret . | |
| 4,359,819 | 11/1982 | Ducret . | |
| 4,769,909 | 9/1988 | Ducret . | |

Primary Examiner—Douglas D. Watts
Assistant Examiner—Willmon Fridie, Jr.
Attorney, Agent, or Firm—DeLio & Associates

[57] ABSTRACT

A hand tool for cutting shielded conduit comprising a first handle member for holding the conduit including clamping means for securing the conduit in a fixed position relative to the first member; a second handle member including a radial cutter head disposed thereon for cutting a portion of the shielding of conduit secured in the first member in a direction essentially parallel to the longitudinal axis of the conduit; means for movably securing the second handle member to the first handle member including menas for adjusting the position of the handle member relative to the other in a direction essentially parallel to the longitudinal axis of the conduit between a plurality of different fixed positions for cutting the conduit.

28 Claims, 3 Drawing Sheets

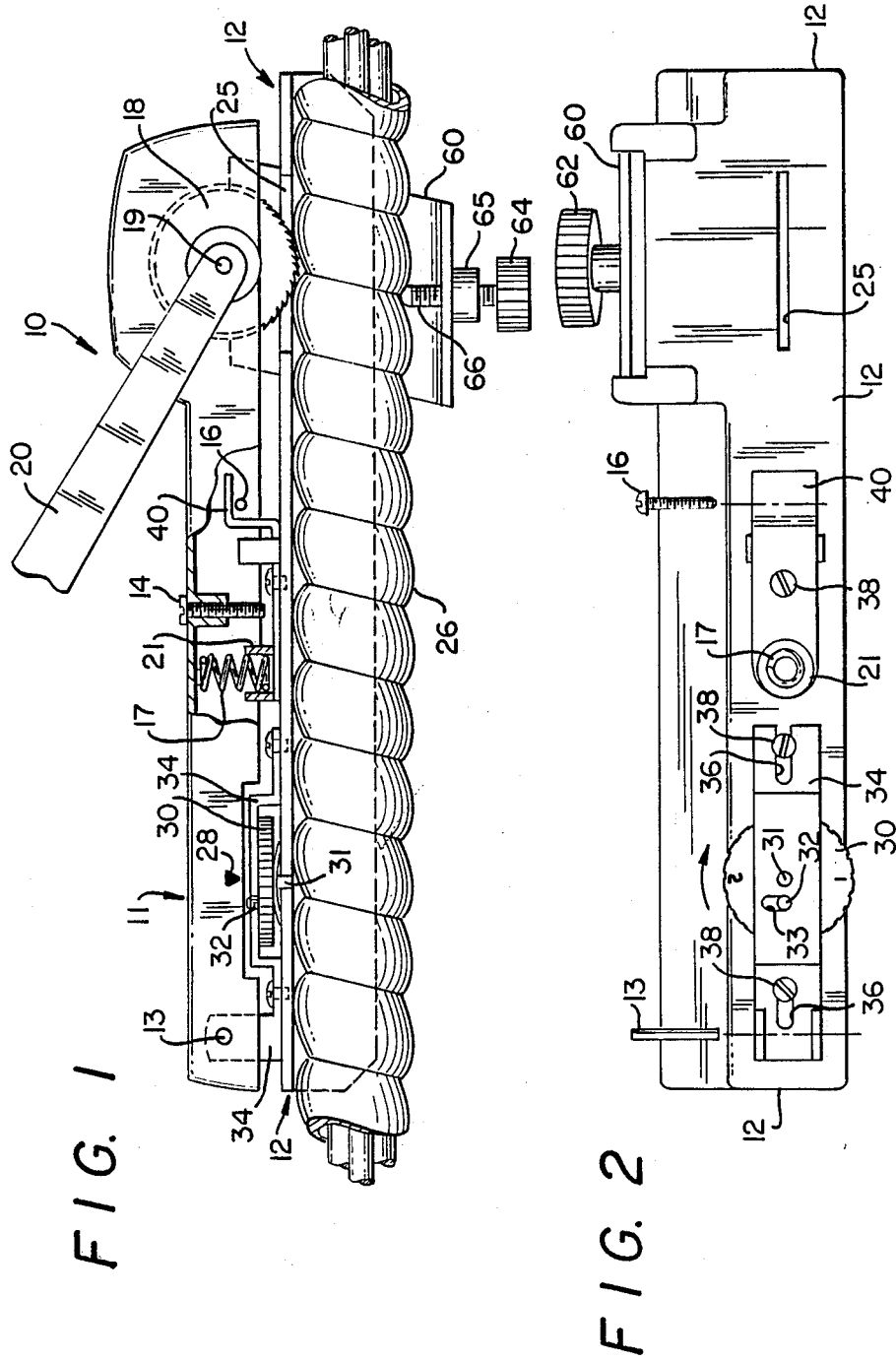

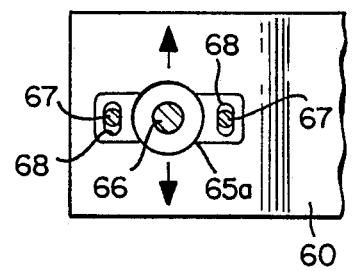
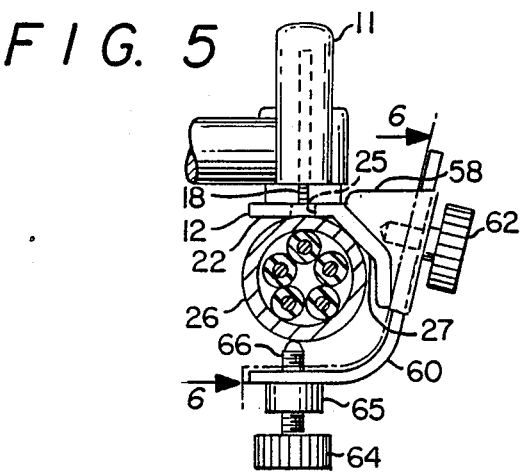
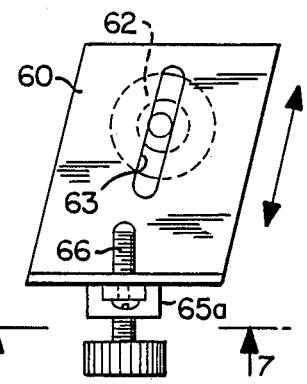
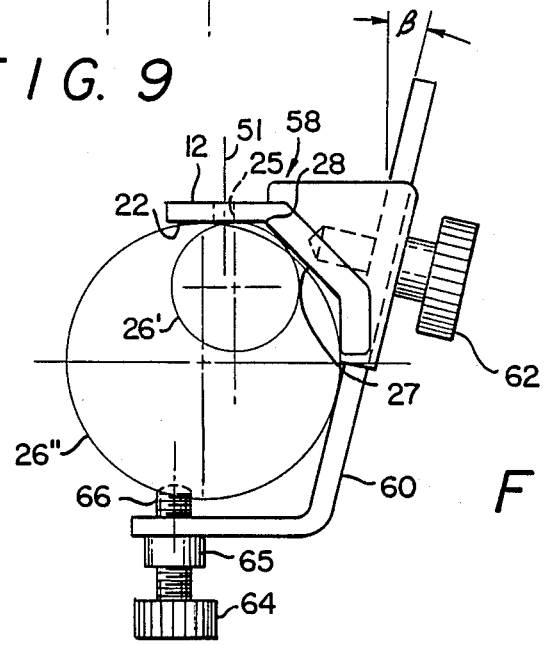

SAW FOR CUTTING LARGE DIAMETER SHIELDED CONDUIT

BACKGROUND OF THE INVENTION

This invention relates to a hand-held saw for cutting the shielding or armor of a shielded conduit such as BX cable and the like and, in particular, to a saw which permits clamping and cutting of conduit of various diameters.

A manual tool for cutting shielding of conduit is disclosed in U.S. Pat. No. 3,851,387 and has successfully replaced the use of hacksaws and other unguided cutting tools for this task. This hand tool permits shielded conduit to be securely held while a radial cutting blade cuts through and severs one or more convolutions of the shielding in a direction generally parallel to the longitudinal axis of the conduit. Once a single convolution of the shielding is completely severed, the shielding at the end of the conduit can be easily removed to expose the insulation and the wires below to make the electrical connections desired. The hand tool holds the cutter head in a rigid and fixed relationship to the shielding while at the same time guarding against injury to the operator and damage to the wires inside the conduit. Improvements to this hand tool have been disclosed in U.S. Pat. Nos. 4,142,290 and 4,359,819, and 4,769,909.

Although the conduit cutting hand tools disclosed in the aforementioned patents work efficiently, they are generally designed to secure only limited range of diameters of shielded conduit. Accommodating both large and small conduit becomes difficult because, for conduit up to about 2 inches in diameter, the larger the diameter of such conduit, the larger is the width of the individual convolutions in the direction of the longitudinal axis of the cable. In order to sever a very wide convolution on a large diameter cable, it is necessary to either utilize a large diameter radial cutting blade or, when utilizing a smaller cutting blade, to move the cutting blade relative to the cable to effect a longer cut in the direction of the conduit axis. The former suggestion is generally impractical since the larger diameter blade will make a deeper cut into the cable with more chance of cutting into the electrical wires therein. The latter method of moving the cutter head relative to the cable has been disclosed in U.S. Pat. No. 4,142,290. However, the mechanism disclosed therein moves the cable relative to the entire hand tool and has not proved practical to accommodate both large and small diameter cables.

Bearing in mind the unsolved problems of the prior art, it is therefore an object of the present invention to provide a saw for cutting shielded conduit which may accommodate both large and smaller diameter conduit.

It is another object of the present invention to provide a hand held saw for cutting conduit which is relatively simple in design and easy to operate.

It is a further object of the present invention to provide a saw for cutting large diameter shielded conduit which permits a single convolution in the armor of shielded conduit to be cut in a single step.

It is yet another object of the present invention to secure the cable in a fixed position relative to the tool during the entire cutting process.

SUMMARY OF THE INVENTION

The above and other objects, which will be apparent to one skilled in the art, are achieved in the present invention which provides a hand tool for cutting shielded conduit comprising: a first, lower, handle member for holding the conduit during cutting, including clamping means for securing the conduit in a fixed position relative to the first member; a second, upper, handle member including a radial cutter head disposed thereon for cutting a portion of the shielding of conduit secured in the first member in a direction essentially parallel to the longitudinal axis of the conduit; means for movably securing the second handle member to the first handle member including means for adjusting the position of one handle member relative to the other in a direction essentially parallel to the longitudinal axis of the conduit between a plurality of different fixed positions for cutting the conduit.

In another aspect, the present invention provides a hand tool for cutting shielded conduit comprising: a first, lower, handle member for holding the conduit during cutting, including clamping means for securing the conduit in a fixed position relative to the first member; and a second, upper, handle member including a radial cutter head disposed thereon and moveable in a cutting plane for cutting a portion of the shielding of conduit secured in the first member in a direction essentially parallel to the longitudinal axis of the conduit; the clamping means including an upper clamping member comprising a pair of non-parallel surfaces, the plane of each surface being parallel to the longitudinal axis of the conduit, and an adjustable lower clamping member adapted to cooperate with the upper clamping member surfaces to contact and secure the conduit therebetween in the fixed position, the lower clamping member being mounted for adjustment at an angle to the cutting plane to receive and secure shielded conduit of varying diameters in a three-point grip.

The hand tool preferably utilizes a sliding support for sliding the first handle member relative to the second handle member in the longitudinal direction, which sliding support may include a hinge to permit pivoting of the handle members and movement of the cutter head toward and away from conduit secured in the first handle member. Preferred handle member position-adjusting means include either a sliding cam linkage operable by a rotatable knob or a sliding detent means to secure the handle members in discrete fixed cutting positions.

BRIEF DESCRIPTION OF THE DRAWINGS

FIG. 1 is a side elevational view, partially cut away and partially in section, of the saw of the present invention with a length of shielded conduit secured therein for cutting.

FIG. 2 is a top plan view of the lower handle member of the saw illustrated in FIG. 1.

FIG. 5 is an end elevational view, partially in section, showing a portion of shielded conduit secured for cutting in the lower handle member clamping means of the saw in FIGS. 1 and 3.

FIG. 6 is a side view of the adjustable lower clamping member of the lower handle member shown in FIG. 5.

FIG. 7 is a bottom view of the adjustable lower clamping member of the lower handle member shown in FIG. 5.

FIG. 8 is an end elevational view of the clamping means of FIG. 5 showing two different diameters of conduit for reference.

FIG. 9 is a side sectional view of the radial cutter of the present invention in relation to sections of individual convolutions of large diameter shielded conduit.

DETAILED DESCRIPTION OF THE INVENTION

Figures 3, 4:
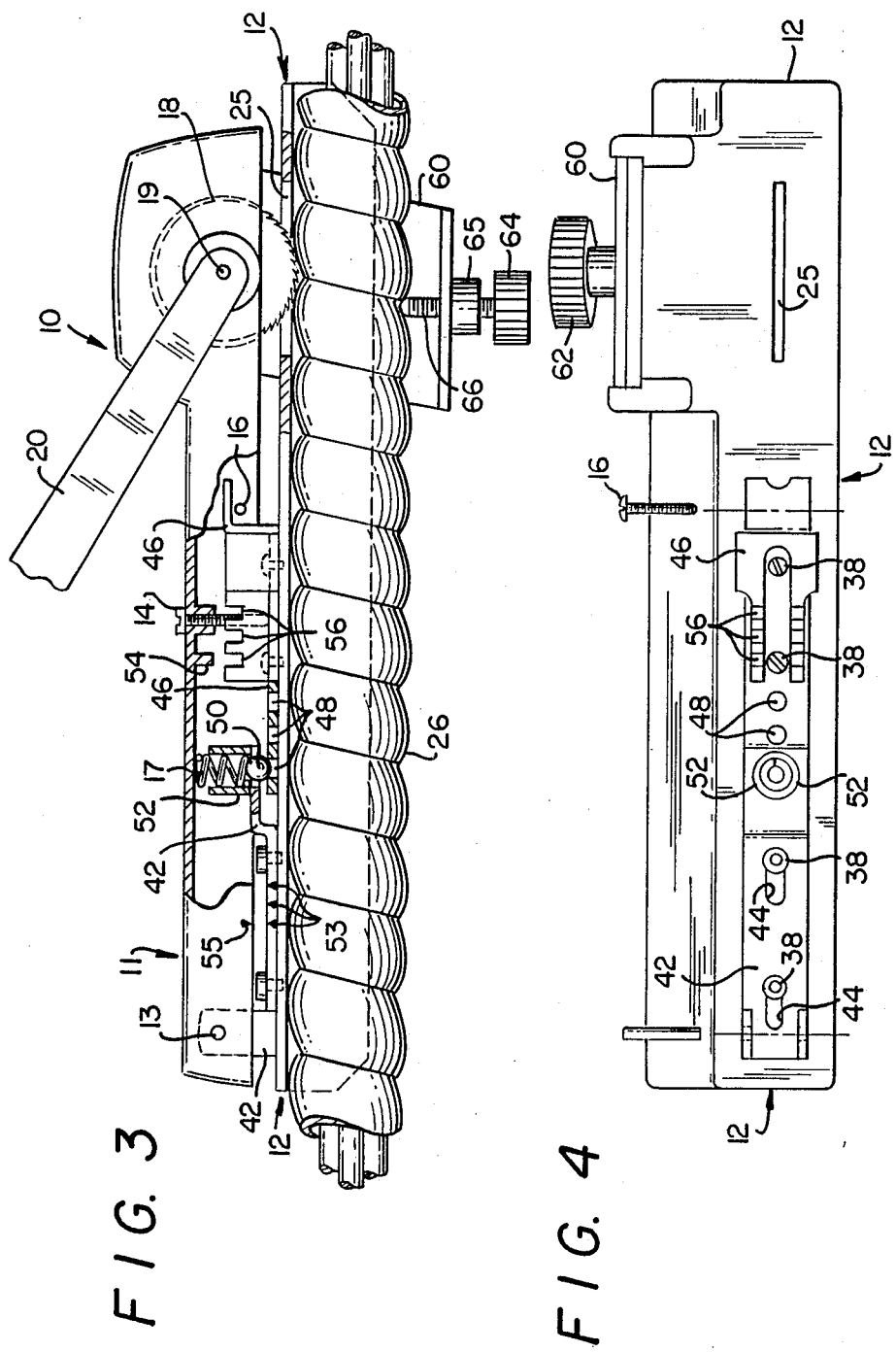
FIG. 3 is a side elevational view, partially cut away and partially in section, of a second embodiment of the saw of the present invention showing a length of shielded conduit secured therein for cutting.
FIG. 4 is a top plan view of the lower handle member of the saw illustrated in FIG. 3.

The present invention is illustrated in FIGS. 1 through 9 which show different embodiments and views of the hereinafter described saw for cutting large diameter shielded conduit. This invention is an improvement to the device disclosed in U.S. Pat. Nos. 3,851,387 and is related to other saws disclosed in U.S. Pat. Nos. 4,142,290; 4,359 819; and 4,769,909, the disclosures of which are herein incorporated by reference. Throughout the drawings, like numerals will refer to like features of the invention.

The saw of the present invention depicted in FIGS. 1 through 9 is intended to be hand held and operable in the horizontal position, as shown in the side views in FIGS. 1 and 3, although it is operable in any other position as well. References to direction made herein are intended for illustration purposes only with respect to the intended horizontal m ode of operation and are not intended to be limiting in any way.

Alternate embodiments of the present invention are depicted in FIGS. 1 and 2 and FIGS. 3 and 4. The hand held saw 10 includes an elongated upper handle member 11 which carries a radial cutter 18 mounted on shaft 19 at the right (forward) end, and a lower handle member 12 which secures the shielded conduit or armored cable 26 (also known in the trade as BX cable) for cutting. Upper handle member 11 is pivotally secured to lower handle member 12 at the left (rearward) end by a pivot pin 13 which acts as a hinge to allow the opposite, forward ends of the handle members 11 and 12 to be swung toward and away from each other. An adjustable clamping mechanism, which will be described in more detail later, includes an adjustable lower clamping member 60 with threaded bushing 65 which allows thumbwheel 64 to adjust clamping pin 66 to secure conduit 26 firmly aligned with the longitudinal axis of elongated handle member 12. The upper horizontal surface portion of lower handle member 12 includes an elongated opening 25, positioned above conduit 26, which allows the passage of cutter head 18 therethrough to contact and cut conduit 26.

Operation of the cutter portion of saw 10 is similar to that described in the aforementioned U.S. patents wherein, for example, the left hand of the operator grasps handle member ®11, 12 and the portion of cable 26 clamped therein while the right hand of the operator moves crank 20 to effect rotation of cutter head 18. By squeezing handle members 11 and 12 together, cutter head 18 may be directed downward through slot 25 and against the upper surface of conduit 26 to cut the individual convolutions of the conduit in a cutting plane direction essentially parallel to the axes of both conduit 26 and handle members 11 and 12.

In order to accommodate conduit having various diameters, including those having relatively large diameters of 2 inches and up to 6 inches or more, it is necessary to sever the entire width of a single convolution of shielding. For large diameter conduit, it is then necessary that cutter head 18 be of a sufficiently large diameter and/or have a sufficiently deep cut into conduit 26 to completely sever a single conduit convolution. For these large diameter conduit this is impractical because of the large diameter needed for the cutter head 18 and the necessity to cut deeply into the conduit, which may then cause damage to the wires running therein. One solution for this problem was suggested in U.S. Pat. No. 4,142,290 wherein a mechanism was disclosed for moving the conduit relative to the lower handle member. In contrast to that solution, the invention herein permits conduit 26 to remain securely fixed within lower handle member 12 while permitting relative movement of the upper handle member 11 and cutter 18 in a direction parallel to the longitudinal axis of conduit 26. As shown in FIG. 9, conduit 26, which is made up of individual wraps or convolutions 26a, 26b, 26c, may have one entire convolution 26a severed by movement of cutter head 18 in the direction shown by the arrow. Severing this one complete convolution of shielding 26a will then permit the excess shielding to be stripped off the end of the conduit to expose the wires therein for electrical connection.

In the first embodiment shown in FIGS. 1 and 2, the means for permitting relative movement between upper handle member 11 and lower handle member 12 includes a thumbwheel position selector knob 30 which controls the relative sliding movement between the members by a sliding cam-type linkage. Pivot pin 13 is mounted on a bracket 34 which is slidingly secured through longitudinal slots 36 by fasteners 38 to the upper surface of handle member 12. Thumbwheel 30 is rotatable about axis 31 mounted in the upper surface of lower handle member 12 and includes an upwardly facing post 32 which is mounted offset from axis 31. Post 32 is slidingly disposed within a slot 33 in bracket 34 which is perpendicular to the longitudinal axis of handle member 12. By rotating thumbwheel 30 in the direction shown by the arrow in FIG. 2, bracket 34 and upper handle member 11 secured thereto may be slid forward in a direction parallel to the axis of conduit 26. Total relative movement between handle member 11 and handle member 12 is twice the distance between thumbwheel post 32 and thumbwheel axis 31, and may be adjusted by positioning knob 30 at any point in between the limits of movement. A reference marking 29 on the side of upper handle 11 indicates the relative position of thumbwheel 30 by the numeral markings on its upper surface (shown in FIG. 2 as "1" and "2").

To limit the downward movement of cutter 18 through conduit 26, handle member 11 includes an adjustable limit screw 14, the lower end of which may be adjusted to bottom out against the upper surface of lower handle member 12, thereby limiting downward movement of cutter head 18. Also included is a bracket 40 mounted on the upper surface of handle member 12 which includes an upwardly directed end which may contact a pin 16 on upper handle member 11 to limit relative movement between the upper and lower handle members. Bracket 40 also includes a spring mount 21 which carries a spring 17 for compression against the interior wall of handle member 11 to bias the forward portions of the handle members away from each other. Pin 16 contacts the raised forward portion of bracket 40 to limit extension of spring 17 and hold cutter head 18 above slot 25.

In use, the first embodiment of the present invention may be operated to make a first cut to the convolutions of conduit 26 with thumbwheel 30 in position "1" as indicated by reference marking 29. Should this first cut fail to completely lever an individual convolution in conduit 26, thumbwheel 30 may then be rotated into position "2", thereby slidingly advancing upper handle member 11 and cutter head 18 forward to a new position (shown in phantom in FIG. 9) whereby the remaining portion of a conduit convolution may be severed.

A second embodiment of the saw of the present invention is depicted in FIGS. 3 and 4. The general configuration of the saw 10 is similar to that shown in FIGS. 1 and 2 (as indicated by the like reference numerals), but includes a different means for adjusting the sliding movement and relative positioning between upper and lower handle members 11 and 12. This second positioning means comprises a sliding detent means, and, in particular, a spring-mounted ball that engages one or more detent holes in the lower handle member. Pivot pin 13 is mounted on a longitudinally sliding bracket 42 having longitudinal slots 44 secured by fasteners 38 to the upper portion of lower handle member 12. A raised forward portion of bracket 42 includes spring mount 52 which holds compressed spring 17 against the inside surface of handle member 11 for biasing the forward portion of handle members 11 and 12 in opposite directions. A second bracket 46 is securely mounted to the upper surface of handle member 12 between bracket 42 and cutter head 18. Bracket 46 includes a plurality (in this case, three) of detent holes 48. A ball 50 is positioned in a hole in the lower end of spring mount 52 and is shown being held by spring 17 against and into the rearward detent hole 48. Pin 16 on upper handle member 11 acts against the raised forward portion of bracket 46 to hold cutter head 18 above slot 25 when the handles are released and, concurrently, maintains ball 50 between spring 17 and detent hole 48.

By pushing upper handle member 11 forward with respect to lower handle member 12, ball 50 is disengaged from the rearward detent hole 48 and permits free sliding of handle member 11 until the next detent hole 48 is reached, corresponding to the next cutting position. Reference markings 53 and 55 on the handle members 12 and 11, respectively, indicate the relative longitudinal position of the handle members. Should a cutter head fail to completely splice a single convolution in conduit 26, upper handle member 11 may be then pushed so that ball 50 is in the next detent position whereupon cutter head 18 may extend the cut in the cable convolution. If necessary, handle member 11 may again be slid forward so that ball 50 is in the forward detent hole 48 to further extend the cut of cutter head 18 in the direction of the conduit axis.

Bracket 46 also includes openings 56, spaced to conform with the spacing of detent holes 48, which receive a tab or protrusion 54 on the inside of handle member 11 at each cutting position. Engagement of the tab and opening in each fixed cutting position prevents undesired movement during cutting of conduit 26 by serving as a positive lock to relative movement of handle members 11 and 12. As with the first embodiment, an adjustable limit screw 14 limits the depth of cut of cutter head 18 while pin 16 contacts the forward horizontal portion of bracket 46 to limit the distance that upper handle member 11 is biased away from lower handle member 12.

The conduit clamping means used in both of the embodiments shown in FIGS. 1 and 2 and FIGS. 3 and 4 is depicted in more detail in FIGS. 5 through 8. The clamping means generally consists of an upper clamping member, which is integral with handle 12 and includes a pair of angled clamping surfaces 22 and 27, and a lower clamping member 60, which includes a clamping pin 66. Pin 66 cooperates with surfaces 22 and 27 to secure conduit 26 in a three point grip or wedging action.

Surface 22 is horizontal as shown in the figures and meets surface 27 along an apex line 28. Both surfaces 22 and 27 are planar and essentially parallel to the longitudinal axis of lower handle member 12 and conduit 26. The included interior angle between them may range from about 105° to about 165°. Cutter slot 25 extends down through clamping surface 22 to permit passage of the cutter head 18 to cut the conduit 26. To complete the three point wedging action, an upwardly facing adjustable clamping pin 66, shown in the figures as a screw, is threaded through a bushing 65 mounted on the underside of the horizontal portion of lower clamping member 60. Clamping pin 66 may be adjusted upward and downward by rotation of thumbscrew 64 to secure and wedge conduit 26 against upper clamping surfaces 22 and 27.

In order to accommodate conduit of greatly varying diameters, lower clamping member 60 is adjustable relative to lower handle member 12 Thumbscrew 62 passes through a slot 63 in the upper portion of member 60 and may be tightened into a threaded opening in handle member 12 to fix the relative positions of members 12 and 60. As seen in side view in FIG. 6, slot 63 is generally vertically oriented to permit relative movement of member 60 in the direction shown by the arrows. It is preferred that the slot 63 angle be about 3 degrees from vertical, but the slot angle may range from about 8 degrees from the vertical in clockwise direction, as shown, to about 2 degrees from vertical in the counterclockwise direction (+8 degrees to −2 degrees). This angle of the slot 63 permits the clamping pin 66 to move horizontally to some extent as the clamping member 60 is raised and lowered. This horizontal movement accommodates the relative positioning of the upper side of the convolutions for various diameter conduits when clamping 66 pin is nested between convolutions as shown in the side views in FIGS. 1 and 3.

As seen in the front view in FIGS. 5 and 8, the upper portion of clamping member 60 is at an angle with respect to the vertical cutting plane 51 of cutter head 18. As shown in FIG. 8, this clamping angle beta, (β) which is preferably about 15° and may range from about 5° to about 25° permits the clamping means to compensate automatically for the offset from the center line of the conduit as the tool is adjusted from the diameter of conduit 26' to the diameter of the conduit 26''. Clamping pin 66 is maintained to the left of the center line of the conduit (as shown in front view in FIGS. 5 and 8) so that a proper three point grip or wedging action may be maintained to secure the conduit between pin 66 and surfaces 22 and 27. Unlike previous types of conduit saws, such as that disclosed in U.S. Pat. No. 3,851,387, the angle (β) of the adjustable clamping member 60 permits clamping pin 66 to be moved horizontally (as seen in front views in FIGS. 5 and 8) to maintain an offset from the center line of the cable as the cable diameter is increased. Without this angle, a secure three point wedging action may not be achieved even though clamping member 60 might be adjustable to accommodate the increased diameter of larger conduits such as diameter shown as conduit 26".

An alternate embodiment of bushing 65 is depicted in FIGS. 6 and 7 wherein there are provided slots 68 which permit limited sliding adjustment of bushing 65a in the direction of the longitudinal axis of the conduit and handle members. Fasteners 67 slidingly secure bushing 65a through slots 67 to permit clamping pin 66 to be longitudinally adjusted to nest between the convolutions at the underside of conduit 26. Such adjustment of clamping pin 66 permits the top side of the conduit convolutions to be adjusted as desired with respect to cutter head 18, as shown in FIGS. 1 and 3.

In operation of clamping means described herein, the adjustment of the positioning of member 60 via thumbscrew 62 is intended to accommodate rough changes in conduit diameter, while thumbs crew 64 for adjustable clamping pin 66 is used to provide a finer adjustment for cable size. This permits a conduit to be quickly and easily removed from handle member 12 by only a few turns of thumbscrew 62, as opposed to many more turns that would be necessary by loosening thumbscrew 64.

Thus, the saw of the present invention provides for: (1) proper securing of conduit of various larger diameters, and (2) relative movement between the handle members to extend the length of the cut to splice the wider individual convolutions of larger conduit.

While this invention has been described with reference to specific embodiments, it will be recognized by those skilled in the art that variations are possible without departing from the spirit and scope of the invention, and that it is intended to cover all changes and modifications of the invention disclosed herein for the purposes of illustration which do not constitute departure from the spirit and scope of the invention.

Having described the invention, what is claimed is:

1. A hand tool for cutting shielded conduit comprising:
    a first handle member for holding said conduit during cutting, including clamping means for securing said conduit in a fixed position relative to said first member;
    a second handle member including a radial cutter head disposed thereon for cutting a portion of the shielding of conduit secured in said first member in a direction essentially parallel to the longitudinal axis of said conduit;
    means for movably securing said second handle member to said first handle member including sliding support means for sliding said first handle member relative to said second handle member and means for adjusting the position of one handle member relative to the other in a direction essentially parallel to the longitudinal axis of said conduit between a plurality of different fixed positions for cutting said conduit.

2. The hand tool of claim 1 wherein both first and second handle members are elongated and wherein said handle member securing means includes a hinge on said sliding support means connecting said first and second handle members to permit pivoting of said handle members and movement of said cutter head toward and away from conduit secured in said first handle member.

3. The hand tool of claim 2 further including adjustable cutter head travel limiting means to restrict the movement of said cutter head toward said first handle member and limit the depth of cutting of said shielded conduit.

4. The hand tool of claim 1 wherein the handle member position adjusting means comprises a sliding cam linkage for moving one of said handle members relative to the other of said handle members along said sliding support means between said different fixed cutting positions.

5. The hand tool of claim 4 wherein both first and second handle members are elongated and wherein said handle member securing means includes a hinge on said sliding support means connecting said first and second handle members to permit pivoting of said handle members and movement of said cutter head toward and away from conduit secured in said first handle member.

6. The hand tool of claim 4 wherein said sliding cam linkage comprises a rotatable knob having an offset pin on one of said handle members, said offset pin being disposed in a slot in the other of said handle members such that rotation of said knob causes relative sliding movement of said first and second handle members between said different fixed cutting positions.

7. The hand tool of claim 6 wherein said knob includes markings on its periphery to identify different fixed cutting positions.

8. The hand tool of claim 5 further including adjustable cutter head travel limiting means to restrict the movement of said cutter head toward said first handle member and limit the depth of cutting of said shielded conduit.

9. The hand tool of claim 1 wherein said position adjusting means comprises sliding detent means to secure said handle members in discrete fixed cutting positions.

10. The hand tool of claim 9 wherein said position adjusting means includes a tab on one of said handle members engagable with an opening in the other of said members in each of said fixed cutting positions.

11. The hand tool of claim 9 wherein said sliding detent means comprises a spring-mounted ball on one of said handle members engagable with detent holes on the other of said handle members.

12. The hand tool of claim 9 wherein both first and second handle members are elongated and wherein said handle member securing means includes a hinge on said sliding support means connecting said first and second handle members to permit pivoting of said handle members and movement of said cutter head toward and away from conduit secured in said first handle member.

13. The hand tool of claim 11 further including adjustable cutter head travel limiting means to restrict the movement of said cutter head toward said first handle member and limit the depth of cutting of said shielded conduit.

14. The hand tool of claim 2 wherein
    said clamping means includes an upper clamping member comprising a pair of non-parallel surfaces, the plane of each surface being parallel to the longitudinal axis of said conduit, and an adjustable lower clamping member adapted to cooperate with said upper clamping member surfaces to contact and secure said conduit of various diameter therebetween in said fixed position, said lower clamping member being mounted for adjustment in a direction along a line at a fixed angle to said cutting plane to receive and secure shielded conduit of varying diameters in a three-point grip.

15. The hand tool of claim 14 further including a pin member on said lower clamping member to contact said conduit, said pin member being adjustable relative to said lower clamping member toward and away from said conduit to further secure said conduit.

16. The hand tool of claim 15 wherein said adjustable pin is mounted on a bushing movable in said longitudinal direction to locate the pin contact point at a desired point on the conduit shielding.

17. The hand tool of claim 14 wherein said lower clamping member adjustment angle, relative to said cutting plane, is from about 5° to about 25°.

18. The hand tool of claim 1 wherein said clamping means comprises a first clamping member on said first handle member and an adjustable second clamping member extending from said first handle member, said first and second clamping members being adapted to secure conduit of various diameter therebetween.

19. The hand tool of claim 18 wherein said adjustable second clamping member includes a pin to contact and secure said conduit in conjunction with said first clamping member.

20. The hand tool of claim 18 wherein said adjustable second clamping member includes a screw mounted for advancement in a direction toward said cutter head to contact and secure said conduit in conjunction with said first clamping member, said screw being mounted on said second clamping member to permit movement relative to said second clamping member in said longitudinal direction.

21. The hand tool of claim 18 wherein said adjustable second clamping member is mounted at an angle to the plane of the cutter head and includes a pin, and wherein said first clamping member includes a pair of non-parallel wall sections, each being parallel to the conduit longitudinal axis and forming an angle therebetween, each of said pin and said wall sections being adapted to contact said conduit and secure said conduit in a three point grip.

22. The hand tool of claim 21 wherein said second clamping member is slideable along guides mounted on said first handle member to insert and remove conduit from said first handle member and adjust said clamping means to accommodate conduit of various diameter, and further including a thumbwheel screw for securing said second clamping member during cutting of said conduit.

23. The hand tool of claim 17 wherein said lower clamping member is adapted for relative horizontal movement along the longitudinal axis of said shielded conduit as it is adjusted to accommodate conduit of varying diameters.

24. A hand tool for cutting shielded conduit comprising:
a first handle member for holding said conduit during cutting, including clamping means for securing said conduit in a fixed position relative to said first member said clamping means comprising a first clamping member on said first handle member and an adjustable second clamping member extending from said first handle member, said first and second clamping members being adapted to secure conduit of various diameter therebetween;
a second handle member including a radial cutter head disposed thereon for cutting a portion of the shielding of conduit secured in said first handle member in a direction essentially parallel to the longitudinal axis of said conduit;
means for movably securing said second handle member to said first handle member including means for adjusting the position of one handle member relative to the other in a direction essentially parallel to the longitudinal axis of said conduit between a plurality of different fixed positions for extending the cutting of said conduit along its longitudinal axis.

25. The hand tool of claim 24 wherein said adjustable second clamping member includes a pin to contact and secure said conduit in conjunction with said first clamping member.

26. The hand tool of claim 24 where said adjustable second clamping member includes a screw mounted for advancement in a direction toward said cutter head to contact and secure said conduit in conjunction with said first clamping member, said screw being mounted on said second clamping member to permit movement relative to said second clamping member in said longitudinal direction.

27. The hand tool of claim 24 wherein said adjustable second clamping member is mounted at an angle to the plane of the cutter head and includes a pin, and wherein said first clamping member includes a pair of non-parallel wall sections, each being parallel to the conduit longitudinal axis and forming an angle therebetween, each of said pin and said wall sections being adapted to contact said conduit and secure said conduit in a three point grip.

28. The hand tool of claim 27 wherein said second clamping member is slideable along guides mounted on said first handle member to insert and remove conduit from said first handle member and adjust said clamping means to accommodate conduit of various diameter, and further including a thumbwheel screw for securing said second clamping member during cutting of said conduit.

* * * * *